(12) United States Patent
DeLong et al.

(10) Patent No.: US 12,139,100 B2
(45) Date of Patent: Nov. 12, 2024

(54) SYSTEMS AND METHODS FOR ENHANCED VEHICLE VALET MODE

(71) Applicant: Ford Global Technologies, LLC, Dearborn, MI (US)

(72) Inventors: Aaron DeLong, Toledo, OH (US); Eugene Karpinsky, Farmington Hills, MI (US); Cameron Smyth, Wyandotte, MI (US); Timothy Thivierge, Carleton, MI (US); Daniel King, Northville, MI (US); Kevin Hille, Plymouth, MI (US); Farhan Ehsan, Lasalle (CA); John Van Wiemeersch, Novi, MI (US); Santosh Lalwani, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 17/412,027

(22) Filed: Aug. 25, 2021

(65) Prior Publication Data

US 2022/0089119 A1 Mar. 24, 2022

Related U.S. Application Data

(60) Provisional application No. 63/081,391, filed on Sep. 22, 2020, provisional application No. 63/081,388,
(Continued)

(51) Int. Cl.
*B60R 25/06* (2006.01)
*B60R 25/04* (2013.01)
(Continued)

(52) U.S. Cl.
CPC .............. *B60R 25/06* (2013.01); *B60R 25/04* (2013.01); *B60R 25/209* (2013.01); *B60R 25/24* (2013.01);
(Continued)

(58) Field of Classification Search
CPC ..................................................... B60R 25/06
See application file for complete search history.

(56) References Cited

U.S. PATENT DOCUMENTS

| 5,927,240 A | 7/1999 | Maxon |
| 5,959,540 A * | 9/1999 | Walter .................... B60R 25/24 |
| | | 340/5.72 |

(Continued)

FOREIGN PATENT DOCUMENTS

| KR | 0113234 Y1 * | 4/1998 | |
| KR | 200445145 Y1 * | 7/2008 | |
| WO | WO-03055731 A1 * | 7/2003 | ............. B62D 1/183 |

*Primary Examiner* — Jean Paul Cass
(74) *Attorney, Agent, or Firm* — Frank Lollo; Eversheds Sutherland (US) LLP

(57) ABSTRACT

Systems, methods, and computer-readable media are disclosed for an enhanced valet mode for vehicles. An example method may include receiving a request to enter a valet mode of the vehicle. The example method may also include enabling the valet mode of the vehicle. The example method may also include disabling, based on the valet mode of the vehicle being enabled, a secure idle mode of the vehicle, wherein the secure idle mode of the vehicle includes locking a gear shifter of the vehicle in a park position when an occupant of the vehicle is outside of a cabin of the vehicle.

17 Claims, 9 Drawing Sheets

Related U.S. Application Data filed on Sep. 22, 2020, provisional application No. 63/081,389, filed on Sep. 22, 2020.

(51) Int. Cl.
    *B60R 25/20*     (2013.01)
    *B60R 25/24*     (2013.01)
    *B60R 25/31*     (2013.01)
    *B60R 25/34*     (2013.01)
    *H04W 88/02*     (2009.01)

(52) U.S. Cl.
    CPC .............. *B60R 25/31* (2013.01); *B60R 25/34* (2013.01); *B60R 2325/205* (2013.01); *H04W 88/02* (2013.01)

(56) References Cited

U.S. PATENT DOCUMENTS

| | | |
|---|---|---|
| 9,767,629 B1 | 9/2017 | Gulati |
| 10,131,321 B1 | 11/2018 | Ahsan et al. |
| 11,685,339 B2* | 6/2023 | Sato ................... G06Q 20/4097 340/5.52 |
| 2006/0107782 A1* | 5/2006 | Perry ..................... B60R 25/06 74/523 |
| 2009/0151412 A1* | 6/2009 | Chung .................... B60R 25/24 70/247 |
| 2013/0144731 A1 | 6/2013 | Baldwin et al. |
| 2014/0274013 A1 | 9/2014 | Santavicca |
| 2015/0203125 A1* | 7/2015 | Penilla ................. G07C 5/0808 701/1 |
| 2016/0176381 A1 | 6/2016 | Krawciw |
| 2017/0034156 A1 | 2/2017 | Ekambaram et al. |
| 2017/0104865 A1 | 4/2017 | Skelton |
| 2017/0120864 A1 | 5/2017 | Fischer et al. |
| 2018/0006819 A1 | 1/2018 | Watanabe et al. |
| 2018/0290628 A1 | 10/2018 | Luke et al. |
| 2019/0122464 A1* | 4/2019 | DeLong .................. B60R 25/20 |
| 2019/0263424 A1* | 8/2019 | Penilla .................. H04L 63/107 |
| 2019/0279447 A1* | 9/2019 | Ricci .................... B60N 2/0022 |
| 2020/0186590 A1* | 6/2020 | Penilla .................. B60L 53/665 |
| 2021/0293572 A1 | 9/2021 | Konrardy et al. |
| 2022/0089119 A1* | 3/2022 | DeLong .................. B60R 25/24 |
| 2023/0077434 A1* | 3/2023 | Penilla ................... G08G 1/205 709/217 |

\* cited by examiner

SYSTEMS AND METHODS FOR ENHANCED VEHICLE VALET MODE

CROSS-REFERENCE TO RELATED APPLICATIONS

This disclosure claims priority to and the benefit of (i) U.S. provisional application no. 63/081,388, filed Sep. 22, 2020, (ii) U.S. provisional application no. 63/081,391, filed Sep. 22, 2020, and (iii) U.S. provisional application no. 63/081,389, filed Sep. 22, 2020, which are all hereby incorporated by reference herein in their entirety.

In addition, this disclosure is related to U.S. application Ser. No. 16/597,551, filed Oct. 9, 2019, and U.S. application Ser. No. 16/597,571, filed Oct. 9, 2019, which are both hereby incorporated by reference herein in their entirety.

BACKGROUND

Valet mode is a vehicle feature that may allow a vehicle owner to limit certain functionality of the vehicle by enabling a setting in the vehicle's HMI before handing off the vehicle to a valet. In some cases, keycodes (the terms password, keycode, code, key, or the like may be used interchangeably herein) may be generated that the vehicle owner (a vehicle owner may be interchangeably referred to herein as a user, vehicle owner, occupant, owner, or the like) may provide to the valet. The keycodes may be used by the valet to access and drive the vehicle when the owner is not present (for example, to drive the vehicle from the parking space back to the owner when the owner is ready to leave the premises). However, some aspects of valet mode may conflict with certain other vehicle systems, and may also have room for improvement in certain respects. For example, multiple keycodes may need to be generated for the valet, such as a first keycode for the valet to enter into a door keypad to access the vehicle and a second keycode to enter into an HMI of the vehicle to start the vehicle. However, given that the door keypad is a physical keypad with a finite number of buttons, the door keypad may be more limited in terms of the keycodes that may be used compared to keycodes that may be entered into the vehicle HMI. Using a shorter keycode that is compatible with the door keypad as a keycode for the HMI may result in reduced security of the system. As a second example, the valet may need to write down (or otherwise record) any keycodes that are used to access and/or drive the vehicle, which may necessitate two-handed operations by the valet when entering a keycode (the valet may need to hold the keycode in one hand, and interact with the vehicle systems with the other hand) and starting the vehicle. This may lead to problems if the valet and/or vehicle owner lose or forget the keycodes. As a third example, any authorized passive entry passive start devices in the vicinity may conflict with the keycode entry by the valet. With respect to this third example, many car manufacturers offer a passive entry (cabin unlock) and passive start (engine starting) system that eliminates the need for a driver to insert a key into a door lock cylinder or ignition lock. One passive engine starting system incorporates the presence of a key fob for starting an engine without the need to insert a mechanical key into an ignition lock cylinder (PEPS). Another passive entry and start system, which is generally referred to as a phone-as-a-key (PaaK) system, involves the use of a smartphone in place of the passive key. The driver may enter a unique keycode into the smartphone that enables the operation of the engine via the engine-start push-button in the vehicle. In a variation of this system, the driver may enter the keycode into an infotainment system in the vehicle that then enables the operation of the engine-start push-button. If any of the such devices are present in the vicinity while the valet is entering a keycode into the vehicle, the vehicle may be "tricked" into exiting the valet mode prematurely. As a fourth example, the valet mode may conflict with other vehicle features, such as a secure idle mode (secure idle mode may prevent a gear shifter from being moved from the "park" position, and is described in additional detail below). These are just a few examples, and are not intended to be limiting.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
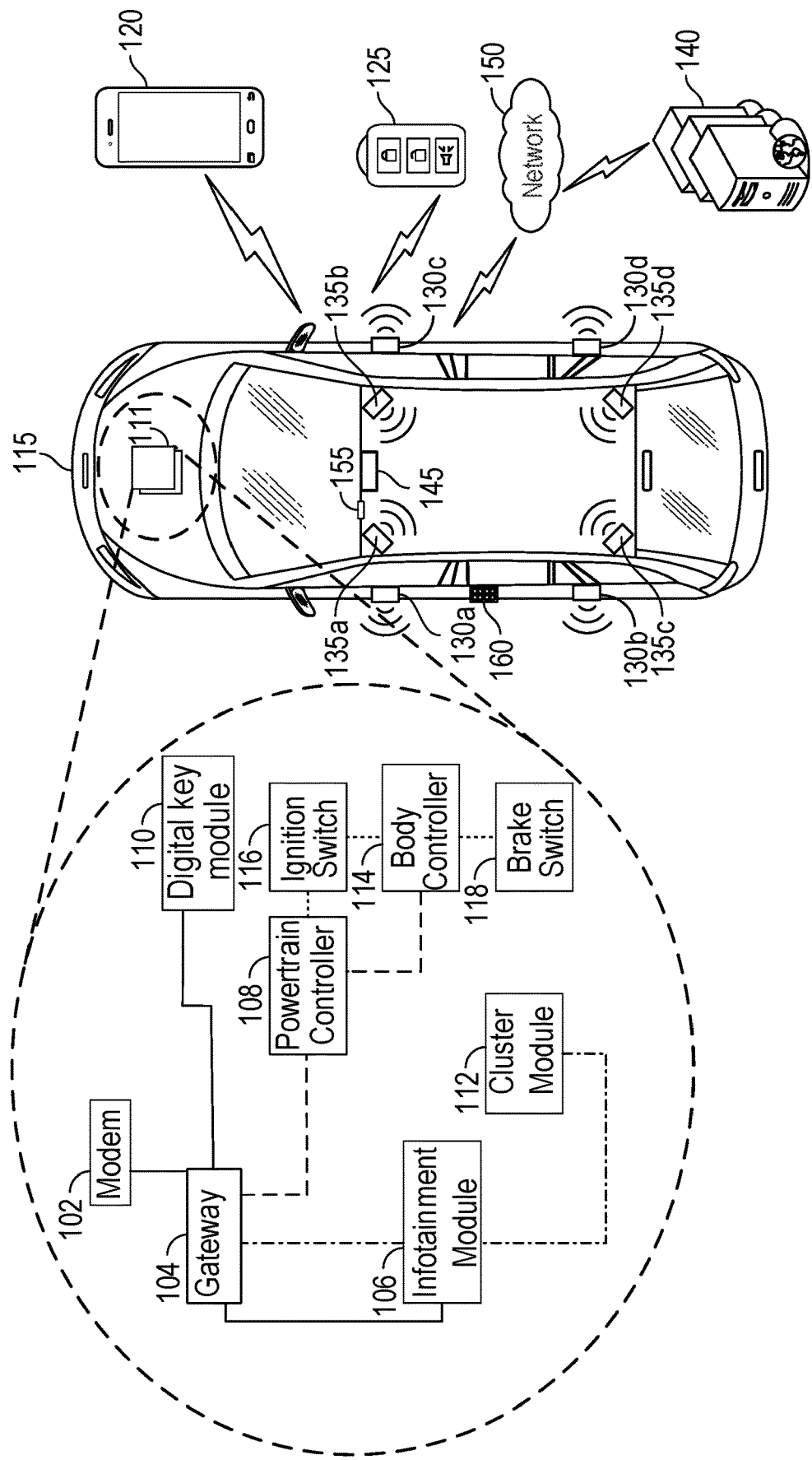
FIG. 1 depicts a schematic illustration of an example system, in accordance with one or more example embodiments of the disclosure.

This disclosure generally relates to, among other things, systems and methods for enhanced valet mode (EVM) in vehicles. Particularly, the enhanced valet mode as described herein may involve at least three facets. A first facet may be directed to a process for generating a first valet keycode for entering a vehicle and a second valet keycode for starting the vehicle. A second facet may be directed to a process for starting the vehicle using the generated keycodes. A third facet may be directed a process for modifying a secure idle mode of the vehicle to work in conjunction with the EVM. "Secure idle mode" and other terms may be described in more detail below.

Throughout the disclosure, reference may be made to the terms phone-as-a-key ("PaaK"), back-up start passcode ("BSP"), valet mode, and enhanced valet mode (EVM).

PaaK may be a vehicle feature that may allow a mobile device (such as a smartphone, or any other type of device) to behave similarly to a passive entry passive start (PEPS) key fob. In some cases, reference may be made to a "mobile device" and a "key fob" individually, however, the term "mobile device" may also include a key fob (or any other type of device) as well. That is, in some cases, the term "mobile device" may refer to either a PaaK device (for example, smart phone) or a PEPs key fob (or any other type of device)that may be used to grant an individual authorization to enter and drive a vehicle. Additionally, any reference to a mobile device, key, fob or any other type of device individually may similarly be applicable to any other type of device as well. For example, reference to an operation performed with respect to a key fob may also be applicable to any other type of device.

Back-up start passcode (BSP) may be a feature bundled with the PaaK feature that may allow for ignition authorization to be performed even in the absence of a PEPS key fob or PaaK mobile device. BSP may allow a user to enter a pre-established valid numeric or alphanumeric code into the HMI of the vehicle to start the vehicle rather than using the key fob or mobile device for authentication to start the vehicle. BSP may utilize the existing door keypad entry system as well as a keycode-based ignition system to allow users to start and drive away the vehicle even if the PaaK phone is not functional (for example, the mobile device has a drained battery) or if the mobile device is lost or stolen. This BSP PaaK back-up system can be distributed over multiple vehicle subsystems and may have functions that are performed by several vehicle ECUs.

Enhanced valet mode (EVM) may be a valet-related feature. Since most vehicle owners may not lend their smartphone to a valet, EVM may be offered with PaaK. EVM may allow the vehicle owner to generate a unique door keypad code and a unique HMI code for use by a valet (the door keypad code may allow the valet to enter the vehicle, and the HMI code may allow the valet to turn on the vehicle and drive the vehicle to a parking space). When PaaK is enabled on the vehicle, and the user selects valet mode from the vehicle HMI, the vehicle (for example, through the HMI) may prompt the user to activate EVM and generate a one-use set of keycodes. If elected, a one-use set of two keycodes (door code and HMI code) may be generated on the HMI for using during the active EVM. The vehicle owner may record the keycodes and provide the keycodes to the valet, or the valet may record the keycodes themselves. Once the vehicle owner or valet exits the EVM, the keycodes may be purged. The codes generated in EVM may allow the valet to enter and drive the vehicle without a PEPS key fob or a PaaK device having to be present in the vehicle, which may be required under normal valet mode. EVM may be different than a "simple valet mode" as described herein, which may simply allow a valet to drive a vehicle, while preventing access of the valet to particular vehicle features.

Returning to the three facets of the enhanced valet mode as described herein, as mentioned above, the first facet may be directed to the process of generating a first valet keycode for entering a vehicle and a second valet keycode for starting the vehicle. For example, the first keycode may be entered by the valet into a keypad located on a door of the vehicle to grant the valet access to the cabin of the vehicle. The second keycode may be entered into the HMI of the vehicle to allow the valet to start the vehicle and drive the vehicle to a given parking location. The first facet may also provide the benefit of integrating a modern keycode system that uses encryption and random, unique codes with a vehicle door keypad system that may be limited in terms of the number of codes that may be utilized (for example, some keypads may be limited to 3,000 codes). In some cases, the encrypted keycode interface may be based on an 8-digit or greater number (which may allow 100 million combinations providing enough valet code possibilities to ensure no duplicates may occur) in front of the existing 3,000 variant keypad system by, for example, using just the first 5 digits of the 8-digit number in a 5-digit keypad system. The keycode may also include any other number of digits as well (or characters other than digits). This integration may allow for increased vehicle security without changing the operation of the vehicle door keypad system (or requiring the vehicle door keypad system to be removed and/or replaced with a different system). The first facet may also provide the benefit of ensuring data security for data flows between different ECUs in the vehicle and ensuring the integrity and/or confidentiality of any keycodes that are generated. The first facet further ensures that a vehicle owner is also provided a copy of any generated valet keycodes to address the situation where a keycode is generated, and then is subsequently forgotten or lost by the valet and/or the vehicle owner. For example, the keycodes may be transmitted to a mobile device of the vehicle owner through BLE, cellular, Wi-Fi, or any other types of communication protocols. The user may have the keycodes stored on their phone as a backup in case the valet loses or forgets the keycodes. Additionally, the first facet also involves automatically presenting (for example, through an HMI of the vehicle) the proper valet mode based on the type of key that is detected in the cabin of the vehicle (non-limiting examples of such keys may include a fob, phone-as-a-key, back-up start passcode, and/or biometric keys). In this manner, in general, at least three problems, among others, are solved by this first facet.

In some embodiments, the first facet may be implemented as follows. Entry to the vehicle cabin may involve the use of the vehicle door keypad. When the user attempts an ignition event after accessing the vehicle cabin, for example, by pressing a brake pedal of the vehicle and depressing an engine start pushbutton (or using any other suitable ignition method), the vehicle may search for a valid PaaK phone key or a valid PEPS fob within the vehicle cabin. When the user selects a valet mode button that may be presented on the HMI of the vehicle, the vehicle can initiate either a simple valet mode or an EVM experience, depending on whether a backup password is stored (for example, in a digital key module, which may be described in more detail with respect to FIG. 1, as well as any other location) with the vehicle and/or whether certain types of devices (for example, fob and/or mobile device) are detected within the vehicle cabin. For example The simple valet mode may be initiated if either a back-up password is not stored and/or if a backup password is stored with the vehicle, but a PEPS fob or a PaaK device is present. The EVM may be initiated when a backup password is stored with the vehicle and/or no PEPS fob or a PaaK device is present. In some cases, a PEPS fob or PaaK device may be detected, but the vehicle owner may nonetheless select EVM so that when they exit the vehicle the valet can still use the vehicle (for example, through the keycodes that may be generated as described herein). As the simple valet mode (for example, non-EVM) may rely on the presence of the PEPS fob or the PaaK device, EVM may be required if the vehicle owner does not want to provide their key fob or device to the valet. In some cases, the vehicle (for example, through an electronic control unit (ECU) (for example, a body controller may search for the devices and may report to a second ECU (for example, a digital key module) if any devices are detected. The body controller and digital key module may be described in more detail with respect to FIG. 1. It should be noted that reference may be made herein to the specific body controller and digital key module, however, these may merely be examples of different types of ECUs that may perform any of the operations described herein. Additionally, in some cases, only one ECU (or more than two ECUs) may perform the same operations described herein.

After receiving device search results from the body controller, the digital key module may verify a keypad configuration of the vehicle (for example, a number of digits associated with the keypad located on the vehicle, and may perform the following operations. First, the digital key module may report to an infotainment module (for example, Ford Sync®) of the vehicle if a key fob is detected within the vehicle (in some cases, this may be performed regardless of whether a PaaK device is detected inside the vehicle to start the valet mode). The digital key module may then generate random number to serve as a keycode. As a first example, the keycode may be a random 8-digit number when the vehicle configuration requires the use of 5-digit keypad codes (for example, the vehicle door keypad requires 5-digit keypad codes). As a second example, the keycode may be a random 10-digit number when the vehicle configuration requires the use of 7-digit keypad codes (for example, the vehicle door keypad requires 7-digit keypad codes). The keycode may also include any other number of digits as well. In some cases, the keycode may also be generated if a key fob is not detected in the vehicle cabin, but at least one PaaK device is detected inside the vehicle cabin instead of a key fob. The digital key module may also notify the infotainment module if neither a PaaK device nor a key fob are detected inside the vehicle. In this scenario, only the simple valet mode may be initiated.

Once the infotainment module receives notification that conditions have been met for the simple valet mode, the vehicle HMI can display a simple valet mode user interface, which may be in the form of a PIN entry screen that may be displayed on the HMI. When the digital key module generates the random 8-digit or 10-digit number (or any other number of digits), it can store the number in memory (for example, nonvolatile memory). The number may be stored, for example, in association with the key indexes of all PaaK devices that were detected inside the vehicle during the key search. After the digital key module generates the random 8-digit or 10-digit number, it may send the first five digits of the generated number to the body controller so it can store it as a keypad code. When the digital key module receives confirmation that the body controller is ready for keycode programming, the digital key module may send to the body controller the first five digits of the random 8-digit or greater number (for example, valet keypad code) when vehicle configuration requires the use of the 5-digit keypad codes or the first seven digits of the random 10-digit number (for example, valet keypad code) when vehicle configuration requires the use of the 7-digit keypad codes and a request to store the valet keypad code. In this manner, a keycode including more digits than would normally be present in a vehicle door keypad keycode may be generated for enhanced security in other vehicle systems (for example, the keycode used on the vehicle HMI to start the vehicle), while still using a truncated portion of that generated keycode as the door keypad keycode. When the body controller receives the request to store the valet door keypad keycode together with the valet key index and the door keypad keycode, the body controller can store the received door keypad code and associate it with the key index. When the body controller stores a new keypad code, the body controller can notify the digital key module, and then exit programming mode. If the body controller cannot store a new keypad code, the body controller may still notify the digital key module and then exit programming mode. The notifications may be any temporal length.

To ensure system security, the keycodes (for example, door keypad code and HMI keycode) may only be generated when the vehicle has undergone a valid transition to a run or an ignition-on state based on the presence of a valid device (for example, PEPS key fob or PaaK mobile device) in the vehicle cabin, or the presence of a valid BSP back-up password. To avoid vehicle owner confusion, compatibility with the simple vehicle valet mode feature may be maintained, while only entering the EVM described herein when it is clear that a key fob is not present within the vehicle cabin, but other non-fob valid keys are present (for example, BSP code, smartphone, facial identification, etc.). To maintain vehicle security, in some cases, valet keycodes may not be duplicated so that the system protects the vehicle owners that frequent the same location often. For example, if the same valet keycodes are used in multiple instances, and the vehicle owner uses a valet service at a same location more than once, a valet that previously drove the vehicle may be able to access the vehicle if valet keycodes are re-used. Additionally, the valet code may be generated such that it may not match a factory keycode or the vehicle owner's personal keycode (for example, BSP keycode). To accomplish these goals, personal keycodes codes along with factory codes assigned to the existing factory keypad system are precluded. The existing factory keypad system may offer less than 3,000 variants, when obvious codes are precluded (for example, 11111, 22222, etc.).

If the digital key module receives confirmation of valet keypad code storage, it can store a valet keycode hash and then associate the keycode entry with an index in memory (for example, hardware secured memory). In some cases, the index may be a designated index, such that whenever the vehicle has been started with the designated valet key index, the digital key module can recognize that the vehicle is in EVM. When the digital key module stores a new valet keycode hash, the digital key module may report this to the telematics control unit (modem) of the vehicle. When the digital key module stores a new valet keycode hash, the digital key module may send the valet keycode (for example, in a plain text format or other format) via an encrypted PaaK BLE interface to all PaaK devices that were detected in the vehicle during a device search. For example, the valet keycode can be contained within the payload of a Bluetooth Generic Attribute Profile (GATT) write command. This information may also be sent via cellular or Wi-fi (or any other communication protocol) if any of the devices are out of BLE range. The digital key module can wait for a given period of time for at least one PaaK device to confirm keycode delivery. If one PaaK device confirms keycode delivery, the digital key module may send confirmation of this fact with the valet keycode (for example, plain text) to the infotainment module. If no PaaK devices have confirmed keycode delivery at the end of one second, the digital key module can send the valet keycode (for example, plain text) to the infotainment module noting lack of confirmation. Once the digital key module sends the plain text valet keycode to the infotainment module, the plain text valet keycode may be deleted from the memory of the digital key module.

When the infotainment module receives the valet keycode and confirmation of delivery of the valet keycode to the PaaK device(s), the vehicle HMI can display a message stating that the valet keycode has been delivered to PaaK device(s), and then may enter the EVM (for example, may display the PIN entry screen on the HMI). If the infotainment module receives the valet keycode from the digital key module, but does not receive any confirmation of delivery of the valet keycode to the PaaK device(s), the HMI may nonetheless enter EVM. When the infotainment module receives body controller information that neither a PaaK device nor a key fob were found in the vehicle cabin, the vehicle HMI can display a backup password (BSP) entry screen, and may request that the user enter a backup password into the HMI. When the user enters a keycode at the backup password entry screen, the infotainment module can request a cryptographic challenge from the digital key module. When the digital key module receives the challenge request, it can issue a challenge to the infotainment module with cryptographic nonce and salt. A salt may be a non-secret, random value that may be used to ensure that the same plaintext will not consistently hash to the same output value. The salt may be used to prevent precomputation attacks, such as rainbow tables. A nonce ("number used once") may be a value that is associated with a message in a cryptographic scheme, and may be unique within some specified scope (such as a given time interval, or a session). The nonce may be used to prevent replay attacks, for example. When the digital key module receives challenge request response, the digital key module may compute, using the cryptographic nonce, another hash of all stored keycode hashes. The infotainment module can compute a hash of the entered keycode using received salt and then compute a hash of this result using received nonce. The infotainment module may respond to the challenge from the digital key module with the computed keycode hash. When the digital key module receives a challenge hash from the infotainment module, the digital key module may compare the challenge hash with the hashes that it computed for the stored keycodes. If the digital key module determines that the challenge hash matches a calculated keycode hash, it can initiate a valet timer, such, for example, a 20 second timer (or any other time period). When the digital key module is within the timer period, for example, while the ignition is on, the digital key module can respond positively to body controller crypto start searches. After this timer expires, the digital key module can respond negatively to body controller crypto start searches when the PaaK device has not been detected in the vehicle interior zone. Crypto start searches may include a specific type of search that the body controller performs when an attempt to start the vehicle is detected. That search may include all device types that could be used to authorize starting of the vehicle (PK, PAAK, etc). The digital key module can de-activate the timer once the body controller clears search criteria or if the digital key module detects the ignition status changed from run to off. Search criteria may refer to a search type and zone associated with a search request from the body controller. There may be several search types and search zones that are specified in the request that are used by other functionality (e.g. unlocking doors).

If the digital key module determines that the received keycode is invalid (for example, cryptographic challenge hash does not match a calculated keycode hash), the digital key module may increment the invalid keycode counter and then notify the infotainment module. When the infotainment module receives an invalid keycode notification, the HMI can notify the user that the entered keycode is invalid and provide an option to retry. If the digital key module determines that the received keycode is valid (i.e. cryptographic challenge hash matches a calculated keycode hash, the digital key module may generate a random 8-digit or greater number. After the digital key module generates the random 8-digit or 10-digit number (based on vehicle configuration), the digital key module can initiate valet keypad code storage by sending the first five digits of the generated number to the body controller so it can store it as a keypad code.

When the body controller receives the programming mode command along with valid RKE response data from the digital key module, the body controller can enter keypad programming mode and notify the digital key module within a given period of time (and may continue to provide notification for a period of time). When the digital key module receives a notification that the body controller is in learning mode, the digital key module can send to the body controller the first five digits of the random 8-digit or greater number (for example, the valet keypad code), the valet key index, and a request to store the valet keypad code. When the body controller receives the request to store the valet keypad code together with the valet key index and the keypad code, the body controller may store the received keypad code and associate it with the key index. When the body controller stores a new keypad code, it may notify the digital key module.

When the digital key module receives confirmation of valet keypad code storage, the digital key module may compute a hash of the valet keycode and then associate the keycode with a key index. When the digital key module stores a new valet keycode hash, the digital key module may report this to the modem. The digital key module may also send the valet keycode (for example, in plain text) to the infotainment module. After the infotainment module receives the valet keycode from the digital key module, the infotainment module can enter EVM. When the infotainment module is in EVM, it may apply the same restrictions as simple valet mode, meaning the user interface and the following functions are restricted: Navigation, USB, CD State, Emergency assistance, Audio, Bluetooth®, SiriusXM®, and Multimedia. Sync® can hold the status (i.e. active, inactive) of Enhanced Valet Mode in memory.

In some embodiments, and as described above, the second facet may be directed to a process for starting the vehicle using the generated keycodes. That is, the second facet may involve processes that may take place following the generation of any valet keycodes as described with respect to the first facet above. In general, at least three problems are solved, among others, by the second facet. First, the second facet ensures the BSP system may only be activated in the absence of a valid device (for example, PEPS key fob and/or PaaK mobile device) within the vehicle, and that the BSP may exit in the presence of a valid device. This may ensure that the valet and/or vehicle owner may not get stranded by not being able to access or drive the vehicle (for example, if the vehicle remains in valet mode and the owner has their valid device on them but forgot the valet code, they may not be able to drive the vehicle if the vehicle remains in the valet mode). Second, the second facet ensures that nearby or departing valid devices do not "trick" the system into thinking valid devices are located in the vehicle once valet mode has been authorized. Third, the second facet ensures that the valet can conveniently start the vehicle using only one hand (as opposed to requiring the use of both hands as is described below) without creating a security risk.

To ensure vehicle owner convenience and to avoid stranding a vehicle owner if the vehicle owner or the valet no longer have a valet keycode, or the valet has moved on to another vehicle owner's vehicle, the first aforementioned benefit of the second facet involves presenting the valet keycode entry screen on the vehicle HMI whenever no other valid device is detected within the vehicle, but defaults to simple valet mode [when a valid device is found within the vehicle. For example, a valet may pull a vehicle up to return it to the owner, shut the vehicle off, and leave the vehicle unlocked. In this scenario, the vehicle may be in EVM. However, if the vehicle detects that a valid device is present within the vehicle cabin, the vehicle may start normally using PaaK or PEPS device validation rather than using BSP. This may allow the owner to then drive the vehicle away without having to enter the valet keycode into the HMI once the valet process is completed.

In some instances, since every valet event generates a new set of keycodes, one for the door keypad and one for the vehicle HMI, the valet may record the keycodes on paper or may take a photo with their phone. As such, entering the keycodes into the door keypad of the vehicle and the HMI of the vehicle may involve a two-hand operation (the valet may need the code in hand while they enter the keycodes into the vehicle). The second benefit of the second facet as described above may eliminate the need for two-handed operations. To allow the valet to enter and start the vehicle with one hand, a timer may be implemented, that starts at the time the valet enters the last digit of the valet code into the HMI. The timer may provide the valet a time window (for example, 20 seconds, or any other amount of time) to push the engine start button to start the vehicle. This timer may also be longer or shorter. In this manner, the valet may be able to enter the keycode into the HMI of the vehicle, and then may have a time window before they are required to start the vehicle.

Finally, is also desirable to ensure that while the valet is in the process of inputting the valet code into the vehicle HMI, that user devices that may be nearby, or are departing from the vehicle but still in range, are not seen or detected by the vehicle. For example, if the vehicle were to detect the vehicle owner's PEPS key fob or PaaK mobile device nearby the vehicle, the vehicle may start while the valet is inputting the keycode based on identifying the valid device rather than based on the keycode input from the valet. This could result in the valet starting the vehicle even if they recorded the keycode incorrectly, and give the valet the impression that they have the correct keycode.

In some embodiments, the second facet may be implemented as follows. Entry to the vehicle cabin may involve the use of the vehicle door keypad. When the user attempts an ignition event after accessing the vehicle cabin, for example, by pressing a brake pedal of the vehicle and depressing an engine start pushbutton (or using any other suitable ignition method), the vehicle may search for a valid PaaK phone or a valid PEPS fob within the vehicle cabin. When the infotainment module receives status that there is a valet password stored in memory, the ignition of the vehicle is off, the status of EVM in the infotainment module is active, and vehicle connectivity is enabled, the infotainment module may display either the valet keycode entry screen or the lock out popup screen on the HMI. When the user enters a keycode at the valet keycode entry screen, the infotainment module can request a cryptographic challenge from the digital key module. The digital key module can then issue a cryptographic challenge to the infotainment module with cryptographic nonce and salt. When the digital key module receives the cryptographic challenge request, the digital key module may compute, using the cryptographic nonce, another hash of all stored keycode hashes. The infotainment module can compute a hash of entered keycode using received salt and then compute a hash of this result using received nonce. The infotainment module can respond to the cryptographic challenge from the digital key module with the computed keycode hash.

In some instances, when the status of EVM in the digital key module is active, the digital key module can only check the received keycode hash against the valet keycode hash. This means that, when attempting to start the vehicle while in EVM, only valid valet keycodes may be accepted. Valid backup passwords may not be accepted, in some cases. To exit EVM, the user can start the vehicle via the valet keycode, key fob, or PaaK device and then select to exit from the HMI. When the digital key module receives a cryptographic challenge hash from the infotainment module, the digital key module can compare it with the hashes that it computed for the stored keycodes. If the digital key module determines that the received keycode is valid (for example, cryptographic challenge hash matches a calculated keycode hash), the digital key module can notify the infotainment module and start an authorization timer (for example, 21 seconds, or any other amount of time). When the authorization timer is active and the vehicle ignition is off, the digital key module can respond positive to crypto start searches, but not negatively to registry or polling searches. After this period expires, the digital key module can respond negatively to body controller crypto start searches. When the status of EVM in the digital key module is active and the digital key module responds positively to a crypto start search during the authorization timer period, the digital key module may report this to the vehicle modem in a signed packet. If the BLEM starts a lockout timer and it is in EVM, it can report this to the modem in a BLEM signed packet.

In some embodiments, and as described above, the third facet may involve modifying a secure idle state of a vehicle to work more conveniently in a system that uses keycodes for drive-away authorization (such as the valet codes as described above) rather than trackable devices (for example, a PEPS key fob or PaaK mobile device). Secure idle may be a production security and convenience feature offered on vehicles that may prevent the gear shifter of the vehicle from being removed from a "park" position when the vehicle is running unless there is a valid electronic key in the ignition system. The secure idle feature may be intended to prevent someone other than an authorized driver of the vehicle (for example, a thief or unauthorized driver) from driving away with the vehicle if the authorized driver/owner leaves the vehicle running while the owner temporarily leaves the vehicle. For example, the authorized driver may leave the device in the vehicle to run back into the house or to quickly step inside a gas station. In the valet context, the use of secure idle as described above may prevent an authorized valet from driving the vehicle if the vehicle is in secure idle mode. Thus, the third facet addresses this potential problem by deactivating the secure idle mode while the vehicle is in a valet mode as may be described in further detail below.

The third facet may suspend secure idle when the vehicle is in EVM until a next key cycle of the vehicle (for example, turning the vehicle ignition on and off). If secure idle was already active when a user activates EVM, secure idle may be disabled, even if the vehicle is currently in a secure idle state. This also means that deactivating EVM may re-enable secure idle. This may alleviate the problems that secure idle mode may cause for valets without much risk to the vehicle owner. To help mitigate potential user inconvenience for the vehicle owner/occupant in daily use, other approaches may be used. Rather than an immediate entry into secure idle (as may happen if no key fob or PaaK phone is in the cabin when the door closes for a running vehicle in park), a 30 second deferral, for example, of secure idle can be used to provide vehicle owners some level of flexibility for quick cabin exits and returns. Any other time duration may also be used. Further, this deferral time period further extended by the vehicle owner/occupant (for example, by providing an input to the HMI of the vehicle). The deferral may be shorter or longer and may require some form of shorter authentication like a one-or two-character code.

When the body controller is in a secure idle state and any of the following conditions (alone or in any combination) below are true, the body controller may trigger the backup password entry screen: brake pedal is pressed, accelerator pedal is pressed, mechanical shifter button is pressed, no key fobs or PaaK devices are detected inside the vehicle, and/or there is a least one backup password created.

In some embodiments, when the keycode entry screen is active on the HMI and the ignition is on, the HMI can return to the previous screen after 30 seconds (or any other time duration) of inactivity. Inputs to the HMI may reset inactivity timer. When the lockout popup expires and the ignition is on, the HMI can return to current screen. When the user enters a keycode at the keycode entry screen, the infotainment module can request a cryptographic challenge from the digital key module. When the digital key module receives a cryptographic challenge request, the digital key module may issue a cryptographic challenge to the infotainment module with cryptographic nonce and salt. When the digital key module receives a cryptographic challenge request, it can compute, using the cryptographic nonce, another hash of all stored keycode hashes. The infotainment module can compute a hash of entered keycode using received salt and then compute a hash of this result using received nonce. The infotainment module can respond to the cryptographic challenge from the digital key module with computed keycode hash. When the digital key module receives a cryptographic challenge hash from the infotainment module, it can compare it with the hashes that it computed for the stored keycodes. If the digital key module determines that the received keycode is invalid (for example, the cryptographic challenge hash does not match a calculated keycode hash), it can increment an invalid keycode counter and then notify the infotainment module. When the infotainment module receives an invalid keycode notification, the HMI can notify the user that the entered keycode is invalid and provide an option to retry. If the digital key module determines that the received keycode is valid (for example, the cryptographic challenge hash matches a calculated keycode hash), it can notify the infotainment module of this and start a 21-second authorization period. The authorization period can be any time duration longer or shorter than 21 seconds. When the digital key module is in a 21-second authorization period while the ignition is on, the digital key module can respond positively, but negatively to searches for the key fob. That is, the digital key module can respond positively to new or repeated body controller crypto start searches but not to a request to search for the fob. This may be to protect for repetitive CAN messages, which are commonly used to ensure message transmission. After this period expires, the digital key module can respond negatively to body controller crypto start searches.

When the infotainment module receives a valid notification from the digital key module and engine status, the HMI can notify the user that the entered keycode has been accepted and that they can now press the brake and shift out of park in order to drive the vehicle. This message can display for 20 seconds (or any time duration longer or shorter than 20 seconds). When the infotainment module receives a valid notification from the digital key module and engine status, the HMI can notify the user that the entered keycode has been accepted and that they can now press the brake and start button in order to start the vehicle. This message can display for 20 seconds (or any other duration of time) unless the vehicle engine status is engine running in Motive mode or engine is running in Non-Motive mode, then this message can be dismissed.

In some cases, the body controller may exit a secure idle state when the digital key module responds positively to body controller crypto start search any of the conditions are met: any door transitions from open to closed, or a brake pedal is pressed, or an accelerator pedal is pressed, or a mechanical shifter button is pressed, or a seatbelt becomes buckled. The body controller can suspend the secure idle operation until the next ignition cycle when the keypad code associated with a valet index is stored in the body controller. When there exists a keypad code associated with the particular index in the body controller, the secure idle operation can be suspended until the next key cycle. As a result, when a user activates EVM, secure idle may be disabled, even if the vehicle is currently in a secure idle state. This also means that deactivating EVM may re-enable secure idle.

Turning to the figures, FIG. 1 shows an exemplary vehicle 115 that supports various remote, passive, and keyless operations, as well as any valet modes in accordance with the disclosure. The vehicle 115 may be any of various types of vehicles such as a gasoline powered vehicle, an electric vehicle, a hybrid electric vehicle, or an autonomous vehicle, and may include components such as one or more vehicle computers 111 (for example, vehicle electronic control units (ECUs)), an infotainment system 145. The vehicle 115 may also include at least an ignition switch 116, a brake switch 118, and/or a keypad 160. The one or more vehicle computers 111 may perform various functions such as controlling engine operations (fuel injection, speed control, emissions control, braking, etc.), managing climate controls (air conditioning, heating etc.), activating airbags, issuing warnings (check engine light, bulb failure, low tire pressure, vehicle in blind spot, etc.), and/or controlling any remote, passive, and keyless operations, and/or valet modes. In some cases, the one or more vehicle computers 111 may include more than one computer such as, for example, a first computer that controls engine operations and a second computer that operates the infotainment system 145. In some cases, the one or more vehicle computers 111 may more specifically include at least a modem 102, a gateway 104, an infotainment module 106, a powertrain controller 108, a digital key module 110, a cluster module 112, and/or a body controller 114. The vehicle computers 110 may communicate with one another, as well as other vehicle systems, using one or more communication buses, such as a Controller Area Network (CAN) bus. The vehicle computers 110 may work in conjunction with one another to accomplish the three facets of the EVM as described herein. Any of these components of the vehicle may include any of the hardware described with respect to the computing device of FIG. 6.

In some embodiments, the modem 102 may be an ECU within the vehicle 115 that may perform a number of different functions. For example, the modem 102 may perform PaaK activation, may receive PaaK BSP alerts (for example, notifications to a user when keycodes are added, deleted, and/or used), may time-stamp PaaK BSP alerts, may transmit PaaK BSP alerts, and may also perform keycodes deletion upon a revocation of an associated PaaK key. The gateway 104 may be a module used for purposes of exchanging data between multiple network buses within the vehicle 115.

In some embodiments, the infotainment module 106 (for example, Ford Sync®) may may serve a number of functions. The infotainment module 106 may provide an interface for PaaK BSP feature setup, as well as for passcode creation, deletion, and/or modification. The infotainment module 106 may also provide an HMI interface within the vehicle to display a list of PaaK phones detected within the vehicle cabin. The infotainment module 106 may also activate PaaK BSP passcode entry interface (for example, when triggered by the body controller). The infotainment module 106 may also initiate PaaK BSP passcode cryptographic challenge and/or response communication channels with the digital key module (for example, cryptographic hash algorithm). The infotainment module 106 may also verify passcode rules. The infotainment module 106 may also provide passcode strength indications when a user creates a PaaK BSP passcode. The infotainment module 106 may also provide an interface for creating and/or modifying keypad codes. The infotainment module 106 may also restrict an HMI interface when the vehicle 115 is in a lockout state. The infotainment module 106 may also determine which valet mode to enable (normal or enhanced valet mode). The infotainment module 106 may also provide an HMI interface for enabling and/or disabling enhanced valet mode. The infotainment module 106 may also maintain enhanced valet state. The infotainment module 106 may also perform any number of other functions as well. The infotainment module 106 may manage the infotainment system 145. The infotainment system 145 can be an integrated unit that includes various components (such as a radio), streaming audio solutions, and USB access ports for digital audio devices), and a navigation system. In an exemplary implementation, the infotainment system 145 has a display system that includes a graphical user interface (GUI) for use by an occupant of the vehicle 115. The GUI may be used for various purposes such as to make a request for a back-up keycode to be associated with a phone-as-a-key (PaaK) device account and/or to input destination information for obtaining travel guidance from the navigation system.

In some embodiments, the digital key module 110 may be another ECU of the vehicle 115 that may serve a number of functions. The digital key module 110 may detect PaaK phones within the vehicle cabin. The digital key module 110 may also serve as PaaK BSP passcode storage and verification (for example, cryptographic hash algorithm). The digital key module 110 may also provide PaaK BSP setup status. The digital key module 110 may also provide PaaK BSP passcode cryptographic challenge and/or response with body controller. The digital key module 110 may also perform vehicle starting cryptographic challenge and/or response with the body controller. The digital key module 110 may also generate an enhanced vehicle passcode. The digital key module 110 may also store and verify an enhanced vehicle passcode. The digital key module 110 may also send copies of enhanced valet passcode to PaaK phones (if any are detected in the vehicle cabin when the valet passcode is generated). The digital key module 110 may also implement a lockout timer and provide a status to the infotainment module 106. The digital key module 110 may also delete PaaK BSP passcode upon associated PaaK key revocation.

In some embodiments, the body controller 114 may be another ECU of the vehicle 115 that may serve a number of functions. The body controller 114 may detect a key fob in a while and report this information. The body controller 114 may also activate PaaK BSP entry screen. The body controller 114 may also authorize vehicle owner requests to start the vehicle (for example, a vehicle starting cryptographic challenge and/or response with digital key module). The body controller 114 may also server as keypad code storage, verification, and modification. The body controller 114 may also report keypad code status. The body controller 114 may also enable and/or disable secure idle mode in the vehicle 115.

In an exemplary implementation in accordance with the disclosure, the one or more vehicle computers 111 may also be configured to support wireless communications with one or more PaaK devices and one or more PEPS key fobs. In this exemplary implementation, a PaaK device 120 is a smartphone configured to run a PaaK software application. The PaaK software application allows the PaaK device 120 to be used for performing various operations such as locking or unlocking a door of the vehicle 115 and/or for starting the engine of the vehicle 115. In at least some cases, the PaaK device 120 may eliminate the need to use a factory key fob, which can prove particularly useful in certain situations such as when the factory key fob is lost or has been accidentally misplaced.

The PaaK device 120 may use one or more of various wireless technologies such as Bluetooth®, Ultra-Wideband, Wi-Fi, Zigbee®, or near-field-communications (NFC), for carrying out wireless communications. In one exemplary implementation, a first set of wireless communication nodes 130a, 130b, 130c, and 130d may be provided on the body of the vehicle 115. In an alternative implementation, a single wireless communication node may be mounted upon the roof of the vehicle 115. The PaaK device 120 may communicate with the vehicle computer 110 via one or more of the first set of wireless communication nodes 130a, 130b, 130c, and 130d so as to allow, for example, an occupant of the vehicle 115 to start the engine before entering the vehicle 115. A radiation pattern of each of the antennas in the wireless communication nodes 130a, 130b, 130c, and 130d may be oriented outwards so as to provide the greatest wireless coverage outside the vehicle 115.

A second set of wireless communication nodes 130a, 130b, 130c, and 130d may be used to provide wireless coverage in the cabin area of the vehicle 115. A radiation pattern of each of the antennas in the wireless communication nodes 130a, 130b, 130c, and 130d may be oriented in a manner that provides optimized wireless coverage inside the vehicle 115. The one or more vehicle computers 111 may use some or all of the wireless communication nodes 130a, 130b, 130c, and 130d to communicate with one or more PaaK devices located inside the vehicle 115. In one exemplary operation, the one or more vehicle computers 111 may use three or more of the wireless communication nodes 130a, 130b, 130c, and 130d to carry out a received signal strength indication (RSSI) and/or a time-of-flight (ToF) trilateration procedure to locate one or more PaaK devices inside the vehicle 115. For example, the RSSI and/or ToF trilateration procedure may allow the one or more vehicle computers 111 to locate and identify a first PaaK device carried by a driver in the vehicle 115 and a second PaaK device carried by a passenger in the vehicle 115.

The PEPS key fob 125 may use one or more of various wireless technologies such as Bluetooth®, Ultra-Wideband, Wi-Fi, Zigbee®, or near-field-communications (NFC), for carrying out wireless communications. In one exemplary implementation, the PEPS key fob 125 communicates with one of the wireless communication nodes 130a, 130b, 130c, and 130d to allow a holder of the PEPS key fob 125 to open a door of the vehicle 115 passively or by depressing a first button on the PEPS key fob 125. The PEPS key fob 125 may include various other buttons such as a door lock button and a panic button. The PEPS key fob 125 may also be used to start the vehicle 115. This action may be carried out by the keyless entry management system 105 sensing the presence of the PEPS key fob 125 inside the vehicle 115 and enabling the engine-start push-button 155 to allow the driver to start the vehicle 115.

In an exemplary embodiment in accordance with the disclosure, the PEPS key fob 125 is linked to the PaaK device 120. For example, the keyless entry management system 105 may use a key index to recognize that the PEPS key fob 125 and the PaaK device 120 are possessed (and operated) by an individual such as the driver of the vehicle 115. In another exemplary embodiment in accordance with the disclosure, the functionality provided by the PEPS key fob 125 may be provided in a different form such as in the form of an NFC card, an identification card, or a biometric device (eye scanner, facial scanner, etc.).

The exemplary vehicle 115 may include a keypad 160 that is located on a driver side door of the vehicle. Similar keypads may be located on other doors of the vehicle 115. A keypad code that is selected by the driver of the vehicle 115 can be used to operate the keypad 160 for opening the driver side door of the vehicle 115. The keyless entry management system 105 may manage various operations associated with the keypad 160 such as verifying a keypad code entered into the keypad 160 and/or processing a request for a new keypad code.

In the exemplary embodiment shown in FIG. 1, the one or more vehicle computers 111 may be communicatively coupled to a server computer 140 via a network 150. The network 150 may include any one, or a combination of networks, such as a local area network (LAN), a wide area network (WAN), a telephone network, a cellular network, a cable network, a wireless network, and/or private/public networks such as the Internet. For example, the network 150 may support communication technologies such as Bluetooth®, cellular, near-field communication (NFC), Wi-Fi, Wi-Fi direct, machine-to-machine communication, and/or man-to-machine communication. At least one portion of the network 150 includes a wireless communication link that allows the server computer 140 to communicate with one or more of the wireless communication nodes 130a, 130b, 130c, and 130d on the vehicle 115. The server computer 140 may communicate with the one or more vehicle computers 111 for various purposes such as for keycode registration and/or keycode verification.

Figure 2:
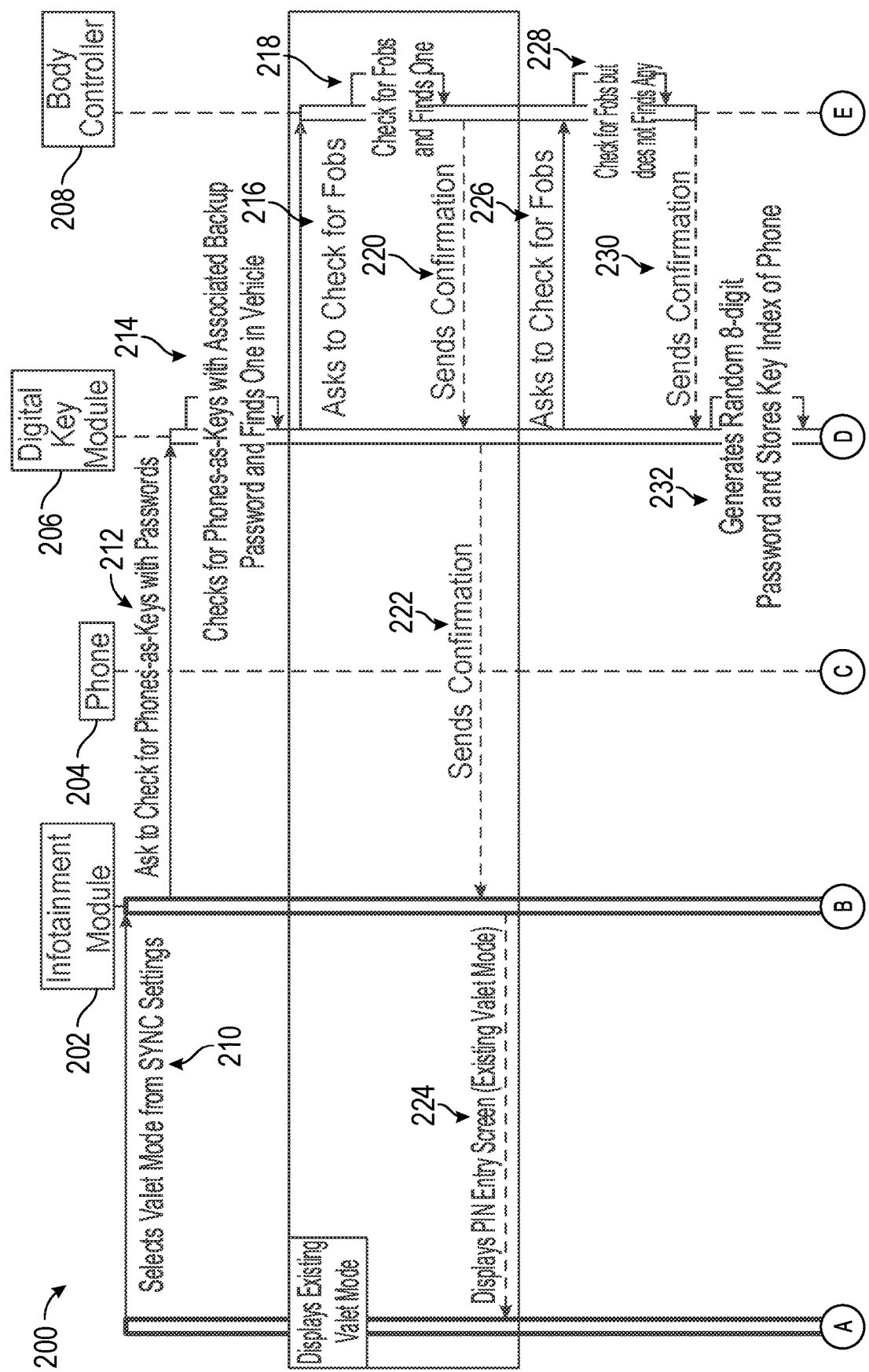
FIG. 2 depicts an example flowchart, in accordance with one or more example embodiments of the disclosure.
Figure 2:
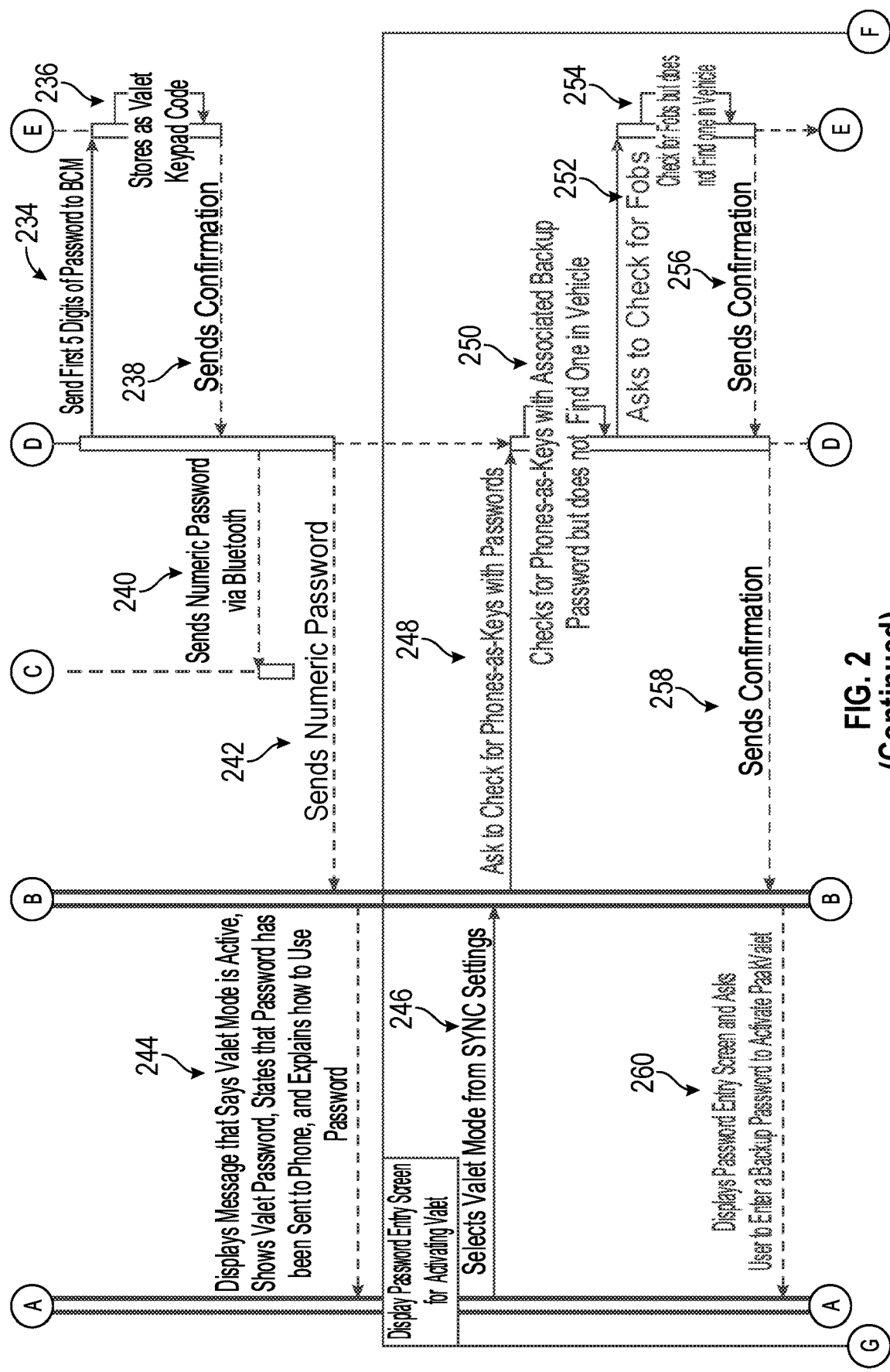
Figure 2:
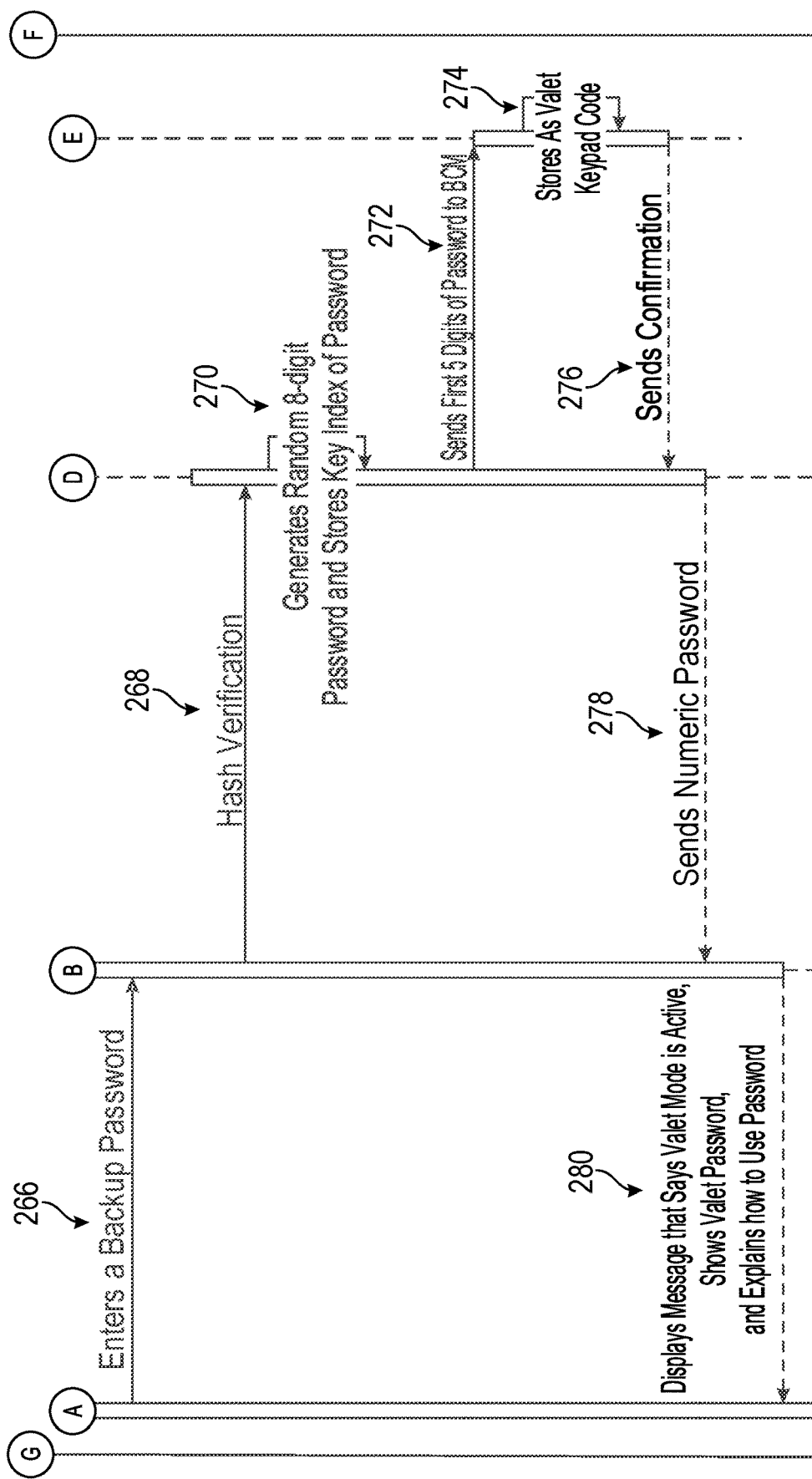

FIG. 2 depicts an example flowchart 200 that pertains to the generation of valet keycodes as described herein. FIG. 2 may pertain to the first facet as mentioned above. The flowchart 200 may involve operations performed with respect to at least an infotainment module 202 (which may be the same as infotainment module 106, such as Sync), a phone 204 (which may be the same as PaaK device 120), an digital key module 206 (which may be the same as digital key module 110), and an body controller 208 (which may be the same as body controller 114).

In some embodiments, the flowchart 200 may begin with operation 210, which may involve receiving a selection of a valet mode from the infotainment module 202. For example, a user within the vehicle may select a valet mode from a settings menu of an HMI of the vehicle. In some cases, the selection may be made outside of an HMI as well. For example, the user may select the valet mode through a mobile device, such as a smartphone, as well. The valet mode may also be selected through any other suitable methods (for example, gestures, voice commands, etc.). From operation 210, the flowchart 200 may proceed to operation 212. Operation 212 may involve the infotainment module 202 checking for phone-as-a-key devices (PaaK devices) with associated passwords (for example, phones that are already connected to the vehicle and have associated passwords). Operation 212 may be followed by operation 214, which may involve the digital key module 206 checking the vehicle for phone-as-a-key devices (PaaK devices), and finding such a device (or multiple devices) within the vehicle. Operation 214 may be followed by operation 216, which may involve the digital key module 206 requesting that the body controller 208 check for any key fobs that may be located within the vehicle. In some cases, the digital key module 206 may search for the key fobs itself instead of requesting the body controller 208 to check for key fobs. Operation 216 may be followed by operation 218, and may involve the body controller 208 searching for key fobs within the vehicle and identifying a key fob (or multiple key fobs) located within the vehicle. Operation 218 may be followed by operation 220, which may involve the body controller 208 sending a confirmation to the digital key module 206 (for example, a confirmation that a key fob was identified). The digital key module 206 may then send a confirmation back to the infotainment module 202 at operation 222. Following operation 222, the flowchart 200 may proceed to operation 224, which may involve the infotainment module 202 displaying a PIN entry screen (for example, a valet mode screen) within the vehicle (for example, on the HMI of the vehicle).

In some embodiments, the digital key module 206 may ask the body controller 208 to check for any key fobs within the vehicle, but the body controller 208 may determine that no key fobs are located within the vehicle (for example, at operation 228). In this case, the flowchart 200 may proceed to operation 230, which may involve the body controller 208 sending a confirmation to digital key module 206 (for example, a confirmation that no key fobs were identified within the vehicle). At operation 232, the digital key module 206 may then generate a password and may also store the password in a particular key index associated with the identified phone-as-a-key device (PaaK device). In some cases, the password may be a random 8-digit number, but may also be any other number and/or type of password as well. At operation 234, the digital key module 206 may then send a subset of the password to the body controller 208. For example, the digital key module 206 may send the first five digits of the password to the body controller 208. Following operation 234, operation 236 may involve the body controller 208 storing the subset of the password as a valet keypad code (for example, a code that may be input into a keypad located on the door of the vehicle in order to access the vehicle). At operation 238, the body controller 208 may send a confirmation to the digital key module 206. At operation 240, the digital key module 206 may also send the password to the phone (for example, via Bluetooth or any other communication protocol). At operation 242, the password may also be sent to the infotainment module 202. Operation 242 may be followed by operation 244, which may involve the infotainment module 202 displaying a message that indicates that the valet mode is active. Operation 244 may also involve the valet password being shown, presenting an indication that the password has been provided to the phone 204, and an explanation of how the password may be used.

In some embodiments, operations 246-280 may involve operations associated with displaying a password entry screen for activating the valet mode (for example, displaying the password entry screen on an HMI of the vehicle). Operation 246 may involve selecting a valet mode from the infotainment module 202. For example, a user within the vehicle may select a valet mode from a settings menu of an HMI of the vehicle. From operation 246, the flowchart 200 may proceed to operation 248. Operation 248 may involve the infotainment module 202 requesting that the digital key module 206 check for phone-as-keys (PaaK devices) with passwords within the vehicle. At operation 250, the digital key module 206 may check for phone-as-keys (PaaK devices) with associated passwords within the vehicle, but may not find any within the vehicle. At operation 252, the digital key module 206 may ask the body controller 208 to check for any key fobs within the vehicle. In some cases, the digital key module 206 may perform this operation itself without using the body controller 208. At operation 254, the body controller 208 may check for key fobs within the vehicle, but may not find any. The body controller 208 may then send a confirmation to the digital key module 206 at operation 256. At operation 260, the infotainment module 102 may display a password entry screen and may request entry of a password to activate the valet mode. At operation 266, the infotainment module 102 may receive the password (for example, a user may enter the password into the HMI of the vehicle). Following operation 266, operation 268 may involve hash verification being performed. Following operation 268, operation 270 may involve a random password being generated by the digital key module 206. In some cases, the password may be a random 8-digit number, but may also be any other number and/or type of password as well. Operation 270 may also involve the randomly-generated password being stored in a key index associated with the password input into the infotainment module 102. Operation 272 may involve the digital key module 206 sending a subset of the randomly-generated password to the body controller 208. In some cases, the subset may include the first five digits of the password. The body controller 208 may then store the subset of the password as a keypad code. The body controller 208 may then send a confirmation to the digital key module 206 at operation 274. At operation 278, the digital key module 206 may send the password to the infotainment module 202. Finally, at operation 280, the infotainment module 202 may display a message indicating that the valet mode is active, may display the valet password, and may provide an explanation to the user as to how to use the password.

Figure 3:
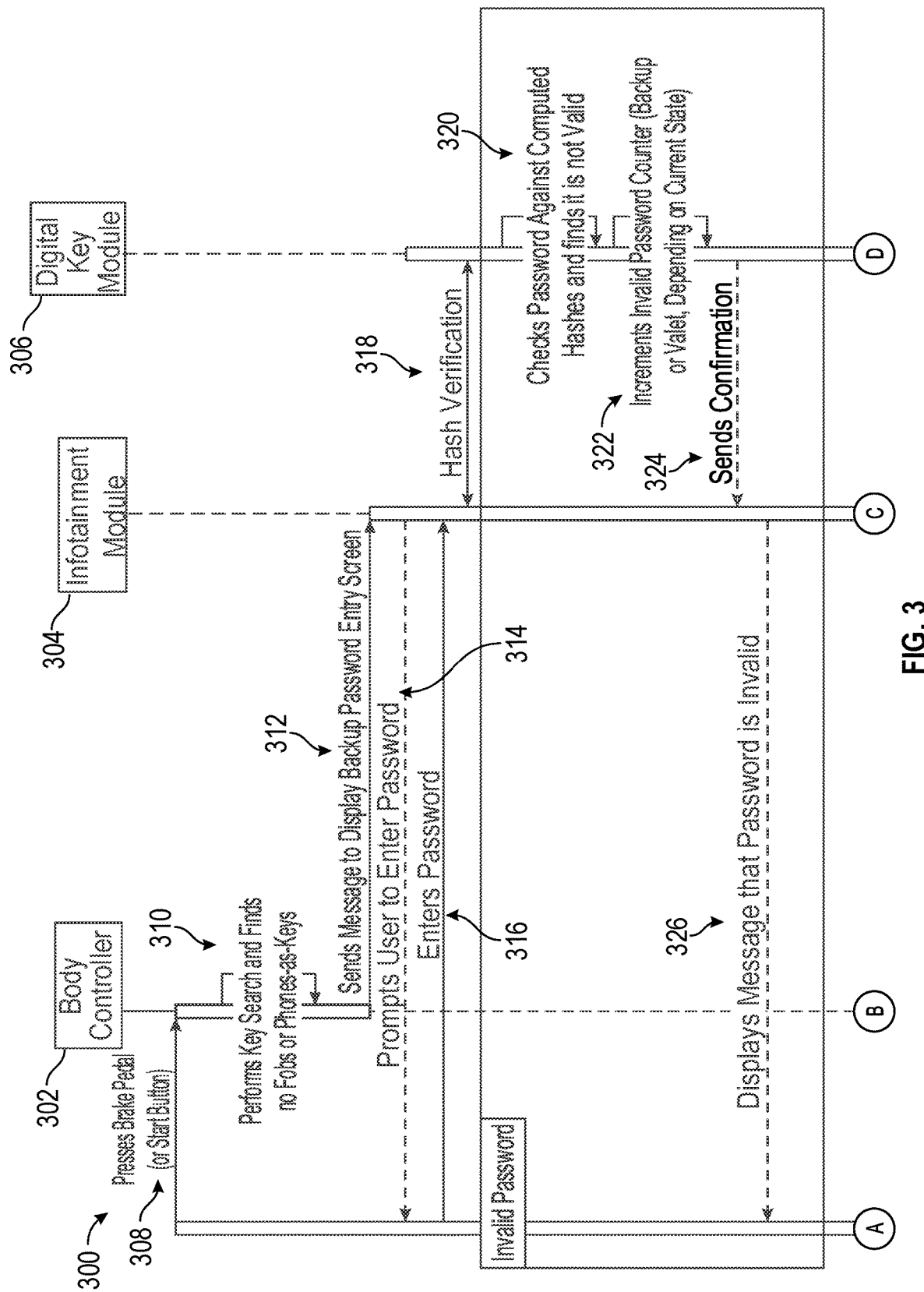
FIG. 3 depicts an additional example flowchart, in accordance with one or more example embodiments of the disclosure.
Figure 3:
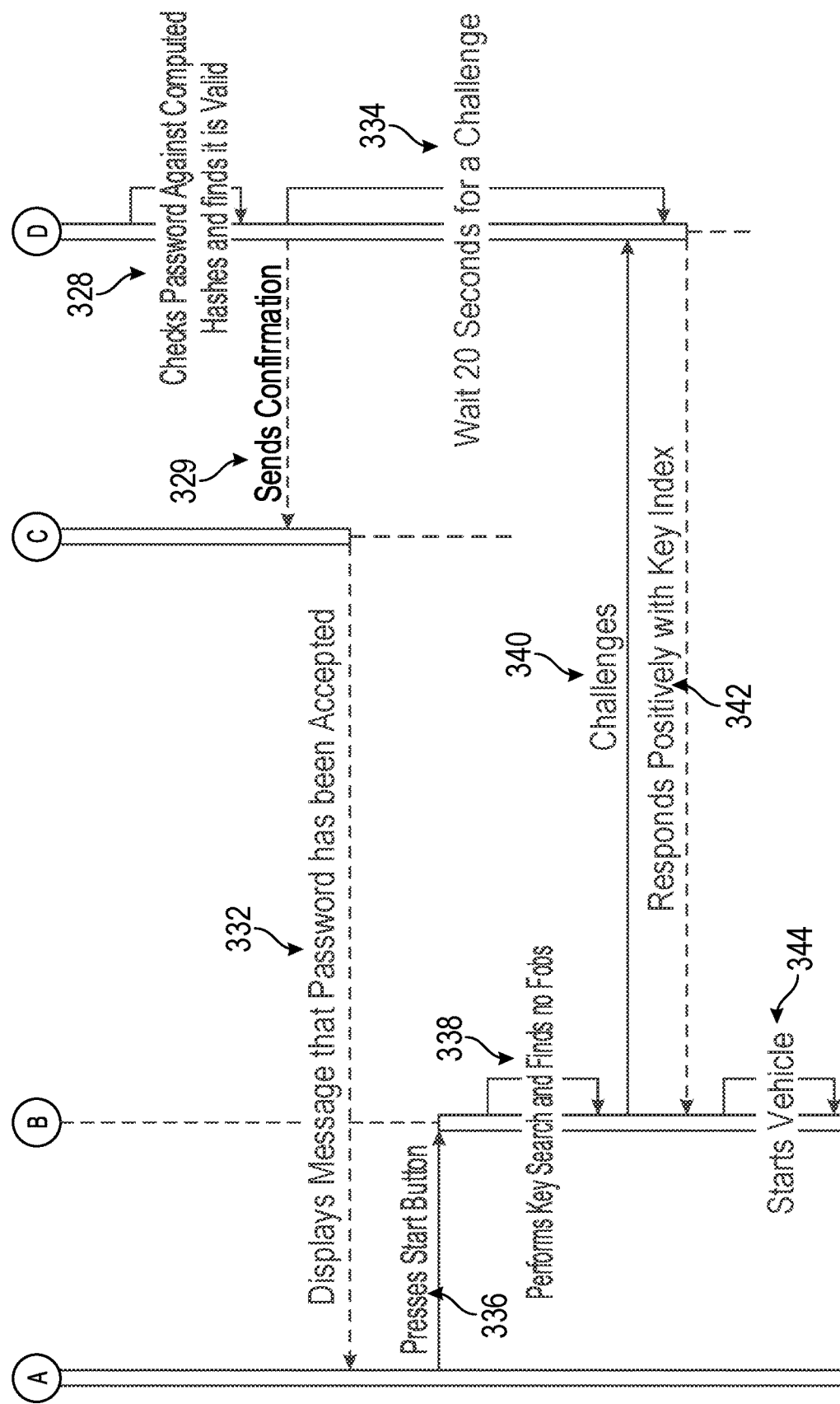

FIG. 3 depicts another example flowchart 300. The flowchart 300 may illustrate an example logical flow associated with the second facet as mentioned above. Similar to FIG. 2, the flowchart 300 may involve operations performed with respect to at least a body controller 302 (which may be the same as body controller 114), an infotainment module 304 (which may be the same as the infotainment module 106), and a digital key module 306.

In some embodiments, the flowchart 300 may begin with operation 308. Operation 308 may involve a brake pedal of the vehicle being pressed or a start button of the vehicle being pressed (for example, by a user within the vehicle). Following operation 308, at operation 310, the body controller 302 may perform a search for key fobs and/or phone-as-keys (PaaK devices) and determine that no key fobs and/or phone-as-keys (PaaK devices) are within the vehicle. Following operation 310, operation 312 may involve sending a message to the infotainment module 304 to display a password entry screen. At operation 314, the infotainment module 304 may prompt a user to enter the password (for example, on an HMI of the vehicle). At operation 316, the infotainment module 304 may receive a password entry. For example, a user may enter the password into the HMI of the vehicle. Following operation 316, operation 318 may involve hash verification being performed using the digital key module 306.

In some embodiments, operations 320-326 may involve operations pertaining to a scenario where an invalid password is entered. Operation 320 may involve checking, by the digital key module 306, the received password against computed hashes and determining that the password is invalid. Operation 322 may involve an invalid password counter being incremented, and operation 324 may involve a confirmation being sent to the infotainment module 304. Finally, operation 326 may involve the infotainment module 326 displaying a message that the entered password is invalid (for example, on the HMI of the vehicle).

In some embodiments, operations 328-344 may involve operations pertaining to a scenario where a valid password is entered. Operation 328 may involve checking, by the digital key module 306, the received password against computed hashes and determining that the password is valid. Operation 329 may involve the digital key module 306 sending a confirmation to the infotainment module 304. Operation 344 may involve beginning a timer to wait for a cryptographic challenge (for example, a 20 second timer, or any other length of time). Operation 332 may involve the infotainment module 304 displaying a message that the password has been accepted. Operation 336 may involve the body controller 302 determining that the start button of the vehicle has been pressed. At operation 338, the body controller 302 may then perform a search for key fobs within the vehicle and may determine that no key fobs are located in the vehicle. At operation 340, a cryptographic challenge may be sent to the digital key module 306. At operation 342, the digital key module 306 may respond positively with a particular key index. At operation 344, the vehicle may be started.

Figure 4:
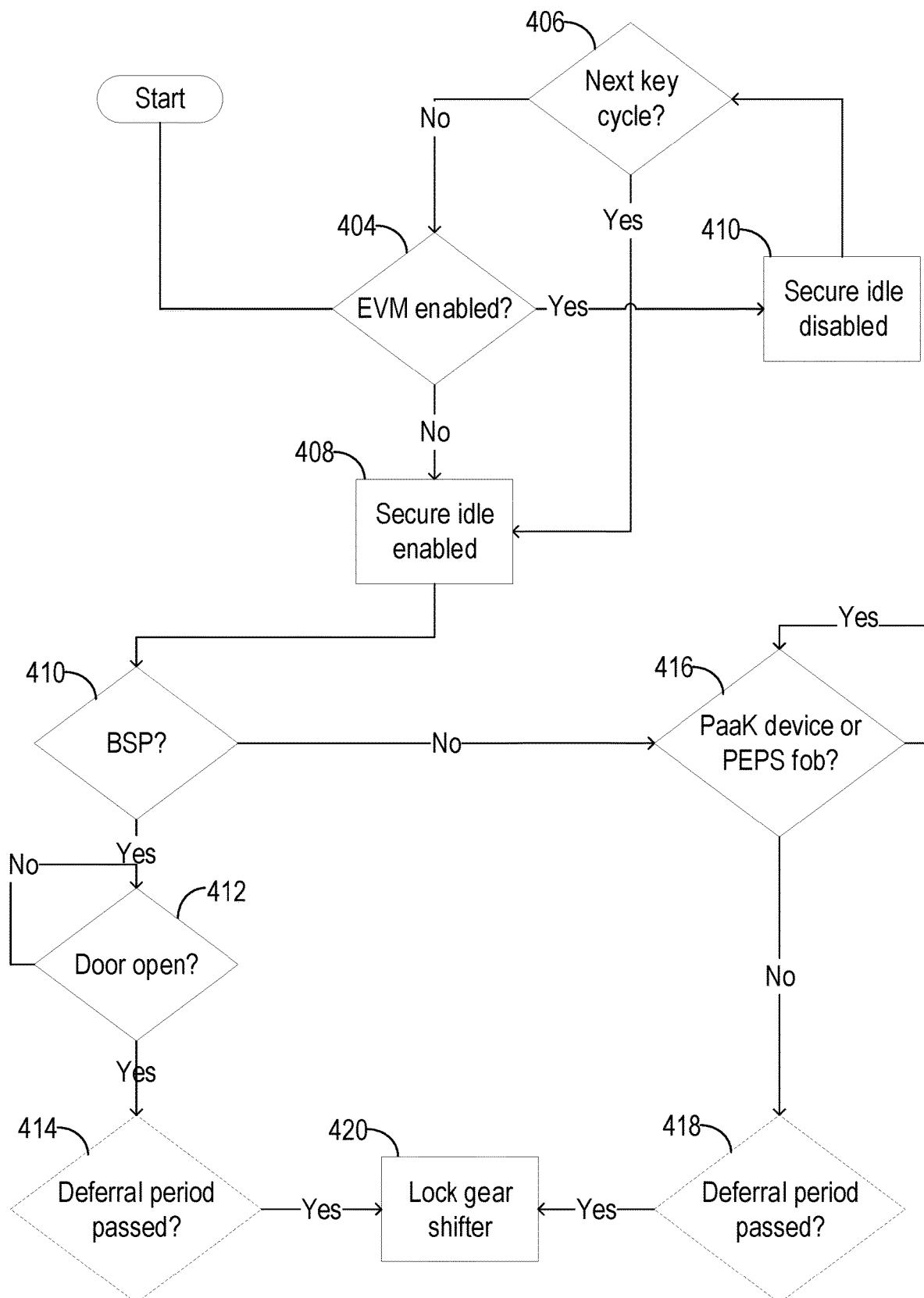
FIG. 4 depicts an additional example flowchart, in accordance with one or more example embodiments of the disclosure.

FIG. 4 depicts another example flowchart 400. The flowchart 400 may illustrate an example logical flow associated with the third facet as mentioned above. Secure idle may be a production security and convenience feature offered on vehicles that may prevent the gear shifter of the vehicle from being removed from a "park" position when the vehicle is miming unless there is a valid device (for example, a key fob or mobile device) in the vehicle cabin. The secure idle feature may be intended to prevent someone other than an authorized driver of the vehicle (for example, a thief or unauthorized driver) from driving away with the vehicle if the authorized driver/owner leaves the vehicle running while the owner temporarily leaves the vehicle. For example, the authorized driver may leave the device in the vehicle to run back into the house or to quickly step inside a gas station. Secure idle may also alert a driver of situations where the person with the key may have left the vehicle or handed off the key without opening a front door (which will honk the horn if no key is in the cabin when the door is closed and the vehicle is running).

The flowchart 400 may begin with condition 404, which may involve a determination as to whether EVM is enabled in the vehicle. If EVM is enabled, then the flowchart 400 may proceed to operation 410. At operation 410, the secure idle mode of the vehicle may be disabled. That is, secure idle mode may be disabled while EVM is enabled to prevent the gear shifter from being locked while the valet is attempting to drive the vehicle as described herein. Following operation 410, the flowchart may proceed to condition 406, which may involve a determination as to whether a next key cycle of the vehicle has occurred. If it is determined in condition 406 that a next key cycle has occurred then the flowchart 400 may proceed to operation 408. Otherwise, the flowchart 400 may proceed back to condition 404. Additionally, if it is determined at condition 404 that the EVM is not enabled, then the flowchart 400 may proceed to operation 408. At operation 408, secure idle may be enabled (or re-enabled).

In some cases, the flowchart 400 may proceed from operation 408 to condition 410 (the portion of the flowchart 400 beginning at condition 410 and ending at operation 420 may illustrate an example operation of the secure idle mode itself). Condition 410 may involve a determination as to whether the vehicle occupant started the vehicle using BSP (for example, using a back-up password instead of authorization through a PaaK device or PEPS fob). If the vehicle occupant used BSP to start the vehicle, then the flowchart 400 may proceed to operation 412, which may involve a determination as to whether a door of the vehicle is open. If it is determined that a door of the vehicle is open, then the flowchart 400 may proceed to operation 420 involving locking the gear shifter of the vehicle in a park position. The flowchart may also optionally involve condition 414, which may involve a determination if a deferral period has passed. Rather than an immediate entry into secure idle (as may happen if no key fob or PaaK phone is in the cabin when the door closes for a running vehicle in park), a deferral of secure idle can be used to provide vehicle owners some level of flexibility for quick cabin exits and returns. Any other time duration may also be used. Further, this deferral time period further extended by the vehicle owner/occupant (for example, by providing an input to the HMI of the vehicle). The deferral may be shorter or longer and may require some form of shorter authentication like a one-or two-character code.

Returning to condition 410, if it is determined that the vehicle occupant did not use a back-up password to start the vehicle, but instead used authorization from a PaaK device or PEPS fob, the flowchart 400 may proceed to condition 416. Condition 416 may involve a determination as to whether the PaaK device or PEPS fob is still located within the vehicle. If it is determined that the PaaK device or PEPS fob is no longer in the vehicle, the flowchart 400 may proceed to operation 420. The flowchart may also optionally involve condition 418, which may involve a determination if a deferral period has passed. The deferral period in condition 414 and the deferral period in condition 418 may be the same deferral period or may be different deferral periods.

Figure 5:
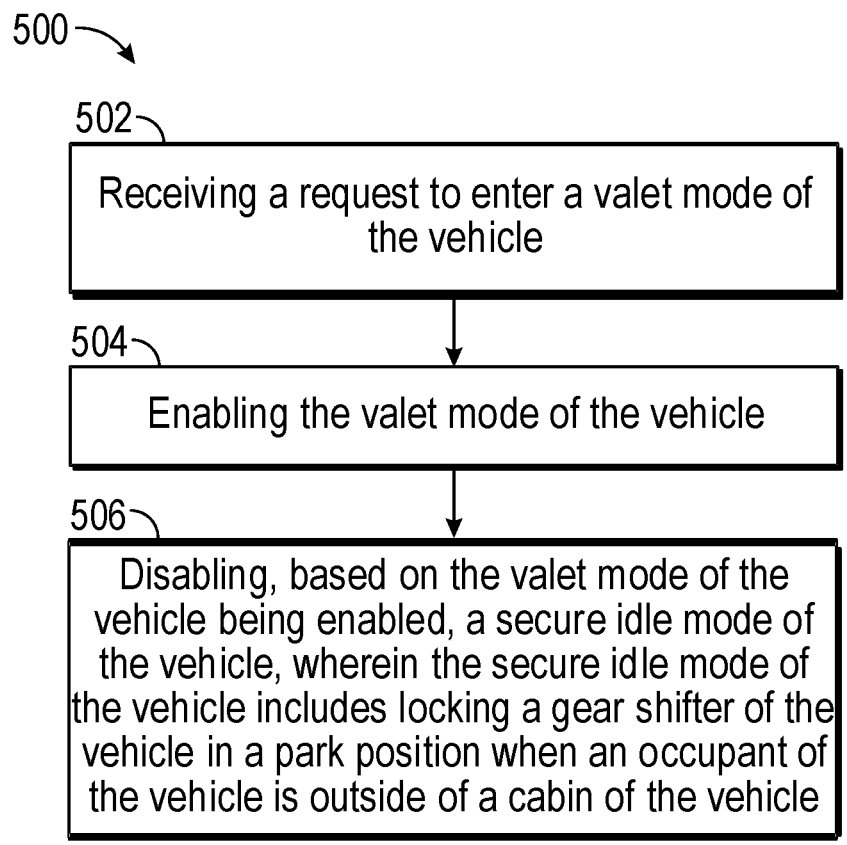
FIG. 5 depicts an example method, in accordance with one or more example embodiments of the disclosure.

FIG. 5 is an example method 500. At block 502 of the method 500 in FIG. 5, the method may include receiving a request to enter a valet mode of a vehicle. In some cases, the request may be received through a mobile device. In even further cases, the request may be received through any other suitable methods. Block 504 may include enabling the valet mode of the vehicle. Block 506 may include disabling, based on the valet mode of the vehicle being enabled, a secure idle mode of the vehicle, wherein the secure idle mode of the vehicle includes locking a gear shifter of the vehicle in a park position when an occupant of the vehicle is outside of a cabin of the vehicle.

Figure 6:
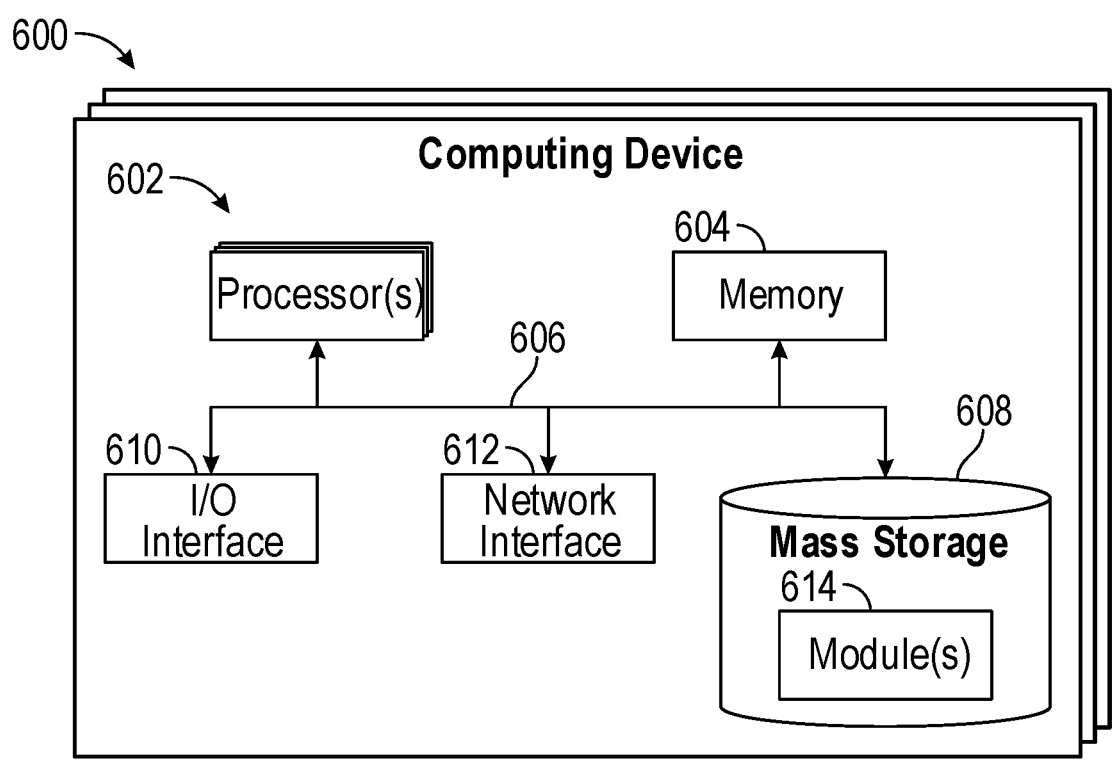
FIG. 6 depicts an example computing system, in accordance with one or more example embodiments of the disclosure.

FIG. 6 illustrates an example computing device 600, in accordance with one or more embodiments of this disclosure. The computing 600 device may be representative of any number of elements described herein, such as any of the controllers, and/or any other element described herein. The computing device 600 may include at least one processor 602 that executes instructions that are stored in one or more memory devices (referred to as memory 604). The instructions can be, for instance, instructions for implementing functionality described as being carried out by one or more modules and systems disclosed above or instructions for implementing one or more of the methods disclosed above. The processor(s) 602 can be embodied in, for example, a CPU, multiple CPUs, a GPU, multiple GPUs, a TPU, multiple TPUs, a multi-core processor, a combination thereof, and the like. In some embodiments, the processor(s) 602 can be arranged in a single processing device. In other embodiments, the processor(s) 602 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) portion; and parallel computing portions with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 602 can access the memory 604 by means of a communication architecture 606 (e.g., a system bus). The communication architecture 606 may be suitable for the particular arrangement (localized or distributed) and type of the processor(s) 602. In some embodiments, the communication architecture 606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Interface Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), moveable RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 604 also can retain data.

Each computing device 600 also can include mass storage 608 that is accessible by the processor(s) 602 by means of the communication architecture 606. The mass storage 608 can include machine-accessible instructions (e.g., computer-readable instructions and/or computer-executable instructions). In some embodiments, the machine-accessible instructions may be encoded in the mass storage 608 and can be arranged in components that can be built (e.g., linked and compiled) and retained in computer-executable form in the mass storage 608 or in one or more other machine-accessible non-transitory storage media included in the computing device 600. Such components can embody, or can constitute, one or many of the various modules disclosed herein. Such modules are illustrated as modules 614. In some instances, the modules may also be included within the memory 604 as well.

Execution of the modules 614, individually or in combination, by at least one of the processor(s) 602, can cause the computing device 600 to perform any of the operations described herein (for example, the operations described with respect to FIGS. 2-5, as well as any other operations).

Each computing device 600 also can include one or more input/output interface devices 610 (referred to as I/O interface 610) that can permit or otherwise facilitate external devices to communicate with the computing device 600. For instance, the I/O interface 610 may be used to receive and send data and/or instructions from and to an external computing device.

The computing device 600 also includes one or more network interface devices 612 (referred to as network interface(s) 612) that can permit or otherwise facilitate functionally coupling the computing device 600 with one or more external devices. Functionally coupling the computing device 600 to an external device can include establishing a wireline connection or a wireless connection between the computing device 600 and the external device. The network interface devices 612 can include one or many antennas and a communication processing device that can permit wireless communication between the computing device 600 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A method comprising:
   determining, by a vehicle, that the vehicle is parked and running and that at least one of: a key fob or mobile device associated with an occupant of the vehicle has temporarily left a cabin of the vehicle or a door of the vehicle is open;
   enabling, by the vehicle and based on determining that a vehicle is parked and running and that the key fob or mobile device has temporarily left the cabin of the vehicle or the door of the vehicle is open, a secure idle mode of the vehicle, wherein the secure idle mode of the vehicle locks a gear shifter of the vehicle in a park position while the key fob or mobile device remains outside of the cabin of the vehicle or the door of the vehicle remains open;
   receiving, by the vehicle, a request to enter a valet mode of a vehicle;
   enabling, by the vehicle, the valet mode; and
   disabling, by the vehicle and based on enabling the valet mode of the vehicle, the secure idle mode.

2. The method of claim 1, further comprising:
   determining that the valet mode of the vehicle is deactivated; and
   enabling, based on the determination that the valet mode of the vehicle is deactivated, the secure idle mode of the vehicle.

3. The method of claim 1, wherein the valet mode of the vehicle is enabled during a first key cycle, and wherein the method further comprises:
   re-enabling, based on a second key cycle of the vehicle, the secure idle mode of the vehicle.

4. The method of claim 1, further comprising:
   determining that a first time period has elapsed after the key fob or mobile device temporarily left the cabin of the vehicle or the door of the vehicle has been open; and
   locking, after determining that the first time period has elapsed, the gear shifter of the vehicle in the park position.

5. The method of claim 4, further comprising:
   receiving an indication for the vehicle to use a second time period instead of the first time period before locking the gear shifter of the vehicle in the park position;
   determining that the key fob or mobile device of the vehicle has been outside of the cabin of the vehicle for the second time period or the door of the vehicle has been open for the second time period; and
   locking, after the second time period has elapsed and based on receiving the indication for the vehicle to use a second time period instead of the first time period, the gear shifter of the vehicle in the park position, wherein the second time period is greater than the first time period.

6. The method of claim 1, wherein the mobile device is a validated Phone-as-a-Key (Paak) mobile device or a validated Passive entry passive start (PEPS) key fob.

7. A vehicle comprising:
   a computer processor operable to execute a set of computer-executable instructions; and
   a memory operable to store the set of computer-executable instructions operable to perform operations of:
   determining that the vehicle is parked and running and that at least one of: a key fob or mobile device associated with an occupant of the vehicle has temporarily left a cabin of the vehicle or a door of the vehicle is open;
   enabling, based on determining that a vehicle is parked and running and that the key fob or mobile device has temporarily left the cabin of the vehicle or the door of the vehicle is open, a secure idle mode of the vehicle, wherein the secure idle mode of the vehicle locks a gear shifter of the vehicle in a park position while the key fob or mobile device remains outside of the cabin of the vehicle or the door of the vehicle remains open;
   receiving a request to enter a valet mode of a vehicle;
   enabling the valet mode; and
   disabling, based on enabling the valet mode of the vehicle, the secure idle mode.

8. The vehicle of claim 7, wherein the computer-executable instructions further cause the processor to perform operations of:
   determining that the valet mode of the vehicle is deactivated; and
   enabling, based on the determination that the valet mode of the vehicle is deactivated, the secure idle mode of the vehicle.

9. The vehicle of claim 7, wherein the valet mode of the vehicle is enabled during a first key cycle, and wherein the computer-executable instructions further cause the processor to perform operations of:
- re-enabling, based on a second key cycle of the vehicle, the secure idle mode of the vehicle.

10. The vehicle of claim 7, wherein the computer-executable instructions further cause the processor to perform operations of:
- determining that a first time period has elapsed after the key fob or mobile device temporarily left the vehicle or the door of the vehicle has been open; and
- locking, after determining that the first time period has elapsed, the gear shifter of the vehicle in the park position.

11. The vehicle of claim 10, wherein the computer-executable instructions further cause the processor to perform operations of:
- receiving an indication for the vehicle to use a second time period instead of the first time period before locking the gear shifter of the vehicle in the park position;
- determining that the key fob or mobile device of the vehicle has been outside of the cabin of the vehicle for the second time period or the door of the vehicle has been open for the second time period; and
- locking, after the second time period has elapsed and based on receiving the indication for the vehicle to use a second time period instead of the first time period, the gear shifter of the vehicle in the park position, wherein the second time period is greater than the first time period.

12. A non-transitory computer-readable medium storing computer-executable instructions, that when executed by a processor, cause the processor to perform operations of:
- determining, by a vehicle, that the vehicle is parked and running and that at least one of: a key fob or mobile device associated with an occupant of the vehicle has temporarily left a cabin of the vehicle or a door of the vehicle is open;
- enabling, by the vehicle and based on determining that a vehicle is parked and running and that the key fob or mobile device has temporarily left the cabin of the vehicle or the door of the vehicle is open, a secure idle mode of the vehicle, wherein the secure idle mode of the vehicle locks a gear shifter of the vehicle in a park position while the key fob or mobile device remains outside of the cabin of the vehicle or the door of the vehicle remains open;
- receiving, by the vehicle, a request to enter a valet mode of a vehicle;
- enabling, by the vehicle, the valet mode; and
- disabling, by the vehicle and based on enabling the valet mode of the vehicle, the secure idle mode.

13. The non-transitory computer-readable medium of claim 12, wherein the computer-executable instructions further cause the processor to perform operations of:
- determining that the valet mode of the vehicle is deactivated; and
- enabling, based on the determination that the valet mode of the vehicle is deactivated, the secure idle mode of the vehicle.

14. The non-transitory computer-readable medium of claim 12, wherein the valet mode of the vehicle is enabled during a first key cycle, and wherein the computer-executable instructions further cause the processor to perform operations of:
- re-enabling, based on a second key cycle of the vehicle, the secure idle mode of the vehicle.

15. The non-transitory computer-readable medium of claim 12, wherein the computer-executable instructions further cause the processor to perform operations of:
- determining that a first time period has elapsed after the key fob or mobile device temporarily left the vehicle or the door of the vehicle has been open; and
- locking, after determining that the first time period has elapsed, the gear shifter of the vehicle in the park position.

16. The non-transitory computer-readable medium of claim 15, wherein the computer-executable instructions further cause the processor to perform operations of:
- receiving an indication for the vehicle to use a second time period instead of the first time period before locking the gear shifter of the vehicle in the park position;
- determining that the key fob or mobile device of the vehicle has been outside of the cabin of the vehicle for the second time period or the door of the vehicle has been open for the second time period; and
- locking, after the second time period has elapsed and based on receiving the indication for the vehicle to use a second time period instead of the first time period, the gear shifter of the vehicle in the park position, wherein the second time period is greater than the first time period.

17. The method of claim 1, further comprising:
- determining, by the vehicle, that in input is received during the secure idle mode, the input including at least one of: an input to a brake pedal or an accelerator pedal of the vehicle or an input to a gear shifter of the vehicle;
- determining that the key fob or mobile device is not present within the cabin of the vehicle;
- determining that a backup password is stored;
- presenting, via a human machine interface (HMI) of the vehicle and based on the determination that the input is received during the secure idle mode and the key fob or mobile device is not present within the cabin of the vehicle, a request for the backup password;
- receiving, by the vehicle, a password input via the HMI; and
- determining a match between the password input and the backup password, wherein disabling the secure idle mode is based on determining the match.

* * * * *